United States Patent [19]

Johnson

[11] Patent Number: 4,630,632
[45] Date of Patent: Dec. 23, 1986

[54] PRESSURE REGULATOR

[75] Inventor: John L. Johnson, Morrisville, N.C.

[73] Assignee: Schrader Bellows Inc., Akron, Ohio

[21] Appl. No.: 674,742

[22] Filed: Nov. 26, 1984

[51] Int. Cl.[4] ............................................ F16K 31/363
[52] U.S. Cl. .................... 137/85; 137/596.18; 137/627.5
[58] Field of Search ........... 137/85, 84, 627.5, 596.18, 137/116.5, 116.3; 92/49; 91/519

[56] References Cited

U.S. PATENT DOCUMENTS

| | | | |
|---|---|---|---|
| 2,232,914 | 2/1941 | Hewitt | 92/49 X |
| 2,916,205 | 12/1959 | Litz | 91/519 X |
| 3,115,147 | 12/1963 | Mueller | 137/116.5 |
| 4,037,879 | 7/1977 | Horowitz | 137/627.5 X |

OTHER PUBLICATIONS

*The Railway Magazine;* pp. 186–188, "Brakes & Brunel" by Semmens; 5/1984.

Primary Examiner—Alan Cohan
Attorney, Agent, or Firm—Frederick L. Tolhurst

[57] ABSTRACT

A regulator is provided in which the bias which urges the unseating of the regulating valve is a piston having a plurality of radial working surfaces, each in its own separate pressure chamber. The chambers are connected to the inlet selectively, singly or in combination, by solenoid valves. The unseating of the regulating valve is opposed by the outlet pressure which works on the entire back side of the piston. In the preferred form a relationship exists between the relative sizes of the individual piston working surfaces so that all the possible outlet pressures attainable by the regulator are equispaced, all the way from 0 psig to the highest regulated pressure.

17 Claims, 13 Drawing Figures

PRESSURE REGULATOR

BACKGROUND OF THE INVENTION

1. Field of the Invention

This invention relates to air pressure regulators. More specifically, the invention relates to an air pressure regulator in which the bias for opening the regulating valve is provided by inlet pressure communicating with a bias piston.

2. Description of the Prior Art

The prior art is replete with all kinds of regulators for air pressure. An example is my own patent, U.S. Pat. No. 3,621,867, assigned to my assignee and issued Nov. 23, 1971. In this patent, the downstream pressure is communicated to a diaphragm which is opposed by an adjustable spring pressure element. When the downstream pressure reaches the desired level, the pressure on the diaphragm is sufficient to oppose the spring to seat the regulating valve. For accuracy in the reading, the poppet valve which comprises the regulator is balanced, that is, exposed on both its upper and lower end to the outlet pressure.

SUMMARY OF THE INVENTION

Under the present invention, instead of a spring in the aforementioned reference, the opening bias for the regulator valve is provided by a piston, the valve having a plurality of separate compartmentalized working chambers, each associated with a working face on the piston. Inlet air is selectively communicated to the chambers by individual solenoid valve units so that the regulated pressure can be instantly adjusted by activating selectively the solenoids, singly or in various combinations. In the preferred version, the respective individual working surfaces of the piston are carefully proportioned so that the pressure settings are equally spaced over the entire outlet pressure range.

Further objects and features of the invention will be apparent from the following specification and the appended drawings, all of which illustrate an embodiment of the invention which is not intended to limit the scope of the invention in any way.

DESCRIPTION OF THE PREFERRED EMBODIMENT

Figures 1, 2:
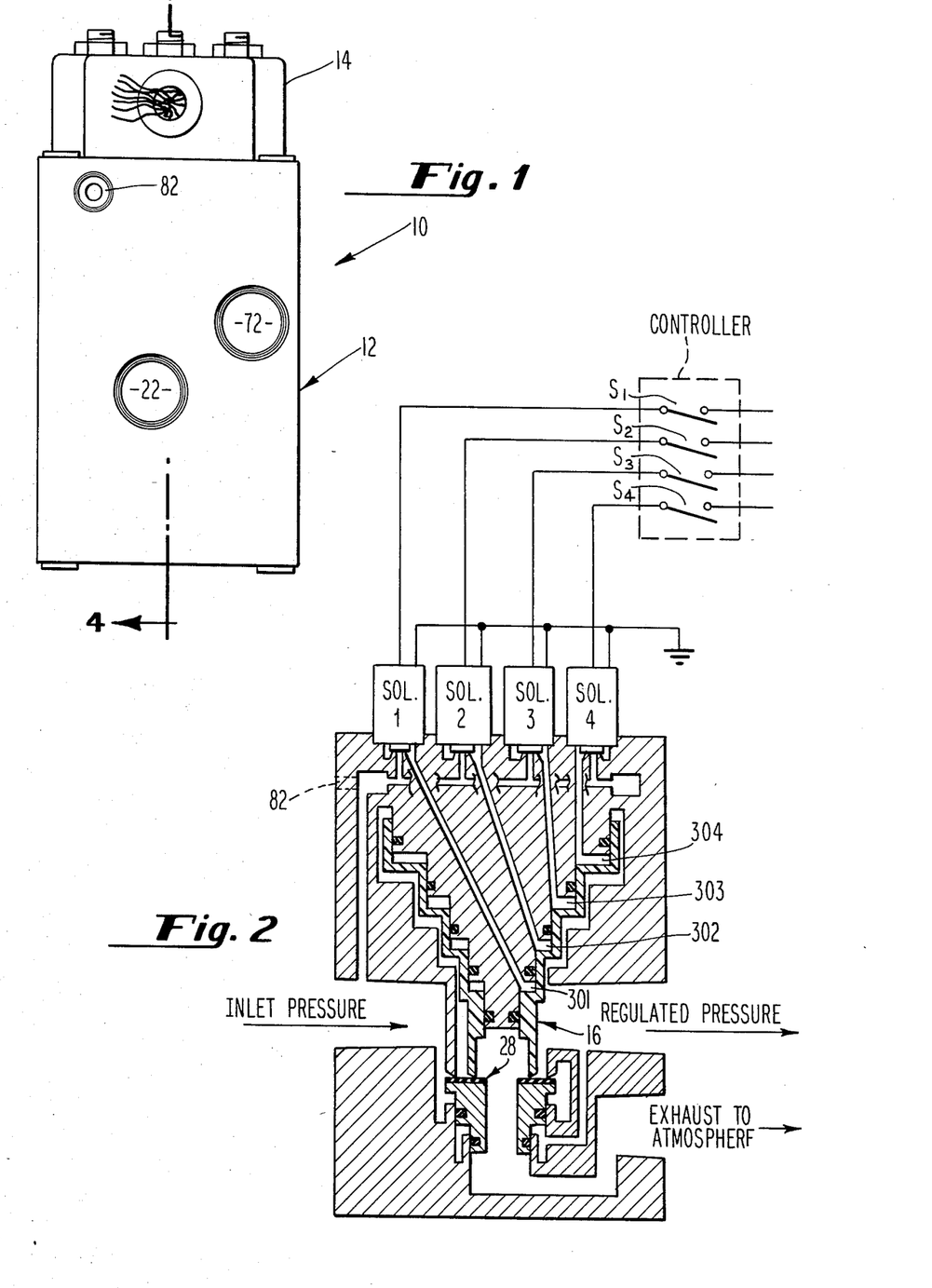
FIG. 1 is a side elevational view of a pressure regulator embodying the invention.
FIG. 2 is a schematic sectional view taken at the line 4—4 of FIG. 1 and showing the regulator and related circuitry.

A regulator embodying the invention is shown in FIG. 1 and generally designated 10. It comprises a body 12 and a solenoid cover 14.

Figure 3:
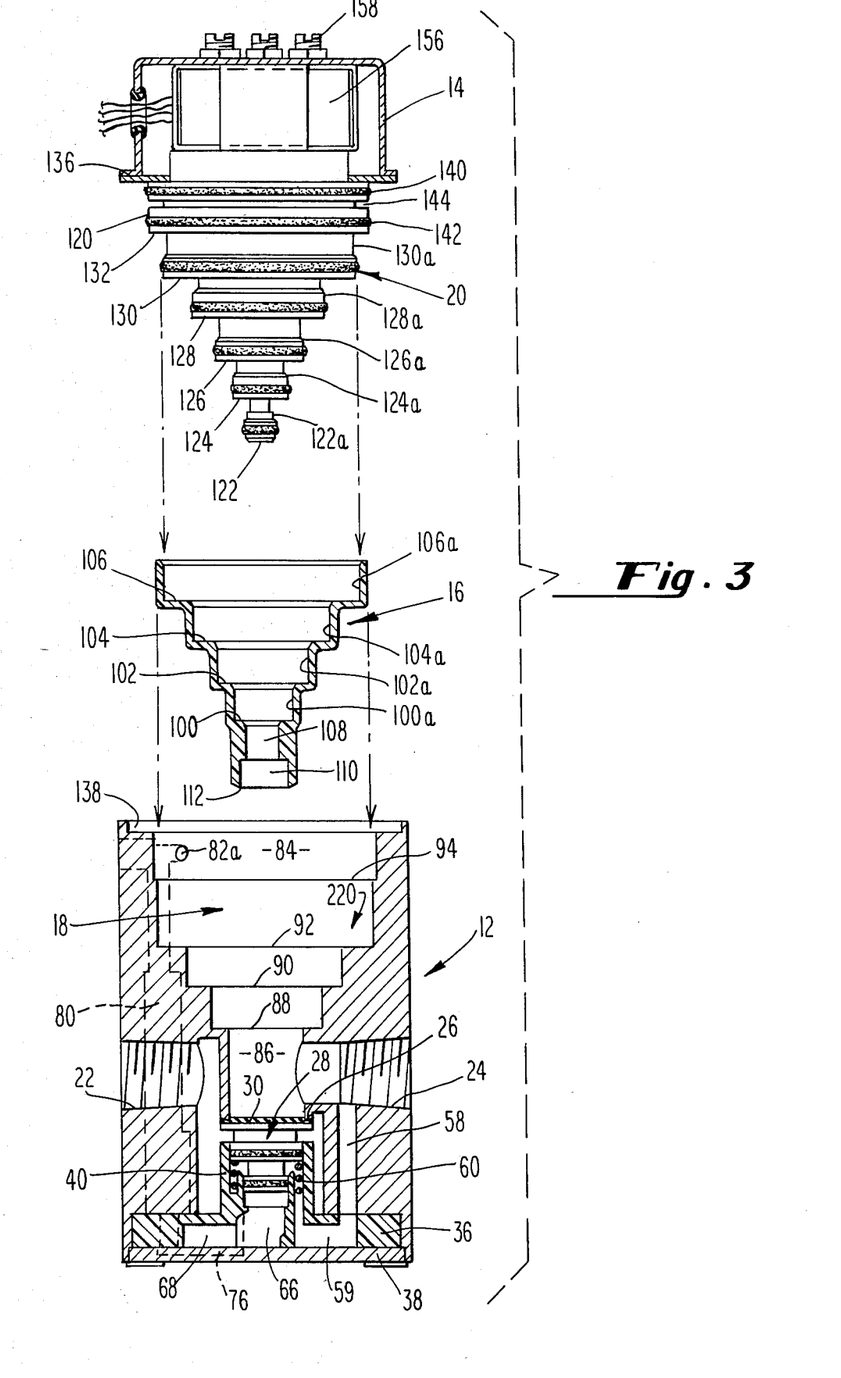
FIG. 3 is an exploded view with part of the solenoid cover removed taken on the line 4—4 of FIG. 1.

A general idea of the parts inside the body is set forth in FIG. 3, an exploded view, to comprise the stepped piston 16, received into the stepped recess 18 of the body 12 and the divider or insert 20 mounted firmly in the recess 18. In assembly the divider or insert 20 nests into the piston 16 which in turn is received into the recess 18 to complete the assembly.

More specifically, the body 12 in the version shown may be a machined casting, preferably formed with opposed, aligned inlet threaded opening 22 and outlet threaded opening 24. Centrally in the casting is formed a downwardly facing main regulator seat 26. Adapted to seat on seat 26 is the poppet 28 which is provided with a gasket seating surface 30, both the poppet and the gasket having a central exhaust opening 32. The poppet is surrounded by an inlet pressure annular well 34 connected to inlet 22.

Into a recess in the lower end of the body 12 is inserted a bottom plug 36 formed with openings and passages that will be described. A bottom cover plate 38 is also provided. Centrally the upper side of the plug 36 has an upward annular wall 40.

The poppet is formed with a circumferential rib 44, grooved and receiving an O-ring 46 sealingly engaging wall 40. Beneath the rib the poppet is formed with a flat inward balancing surface 48. Inward from the annular wall 40 the plug 36 is formed with an annular spring well 50 and inward from that, an inner annular wall 52. At its reduced lower end the poppet is formed with the outward rib 54 having a groove enclosing an O-ring 56 which rides sealingly against the inner annular wall 52.

The body 12 is formed with a vertical outlet balance passage 58 which extends downward from the outlet 24 to a horizontal balance passage 59 (FIG. 11) which connects the regulated pressure inwardly and then upward to the spring well 50, thus communicating the outlet pressure to the balance surface 48 to effect a balance between the outlet pressure working against the upper surface of the gasket 30 and working against the downwardly facing balance surface 48.

A spring 60 (FIG. 4) is disposed compressively between the bottom of the well 50 and the balance surface 48 and urges the poppet upwardly to seal against seat 26. In addition, the inlet air works against the downwardly facing surface 31 further urging the poppet upward.

Figure 8:
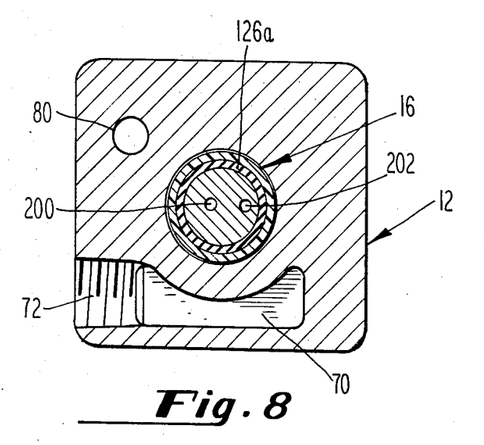
FIG. 8 is a sectional view taken on the line 8—8 of FIG. 4.
Figure 10:
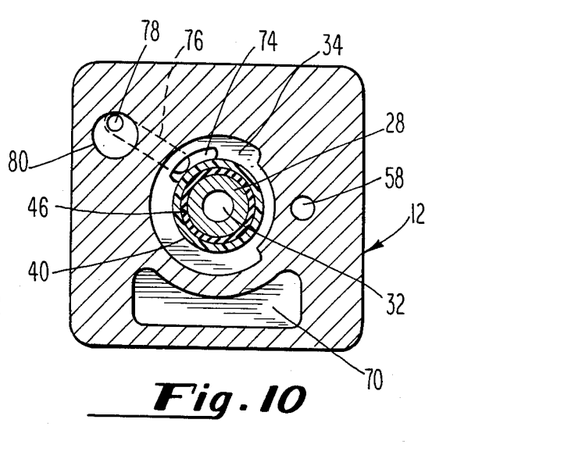
FIG. 10 is a sectional view taken on the line 10—10 of FIG. 4.
Figure 11:
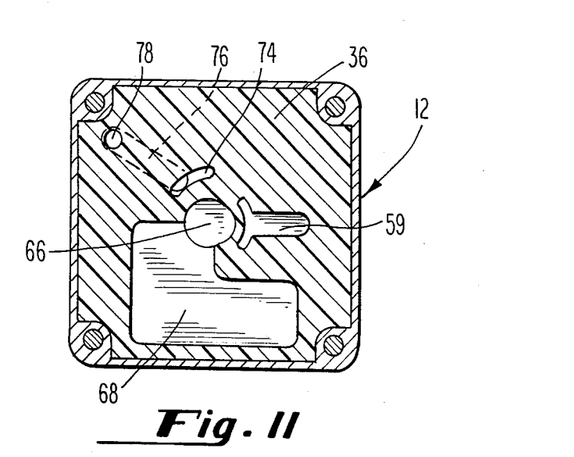
FIG. 11 is a sectional view taken on the line 11—11 of FIG. 4.

As stated, the poppet is formed with a central exhaust bore 32 which permits exhaust air (as will be explained) to vent out to atmosphere down through bore 32 and into a central cavity 66 in the plug 36 which flares outwardly as at 68 (FIG. 11). As best shown in FIG. 10, above the plug 36 the recess 68 communicates with the exhaust channel 70 which extends upward through the body and communicates with the exhaust port 72 (FIGS. 8 and 1).

Figure 7:
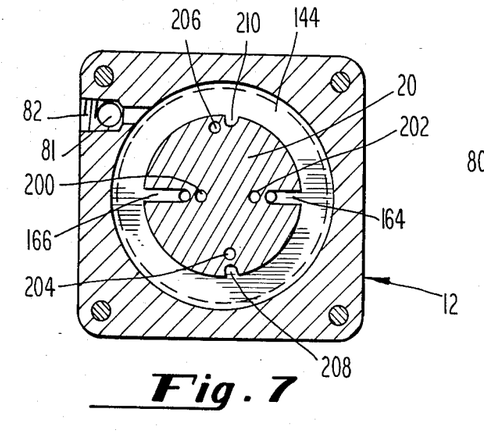
FIG. 7 is a sectional view taken on the line 7—7 of FIG. 4.

The annular inlet well 34 (FIG. 4) extends down to the plug 36 and is sealed off thereby. However, as best shown in FIG. 10 the plug is channeled downwardly as at 74 to intersect the passage 76 in the plate 38 which extends radially outward from the center of the plug to intersect a vertical inlet passage 78. The latter aligns with and communicates with a larger passage 80 which extends upwardly in the body (FIG. 4) to a reduced section 81, which intersects with a lateral auxiliary inlet opening 82 which is normally plugged (FIG. 7 and FIG. 1). The lateral auxiliary inlet opening 82 reduces inwardly and intersects as at 82a with the uppermost section 84 of the recesses 18 in the body.

Turning now to the formation of the recess 18 (FIG. 3), there is at its lower end a cylindrical wall 86 aligned with the inlet opening 22 and intersecting the outlet opening 24. Above this wall is a lower annular shelf 88 extending outward to a riser. Next above there is shelf 90 extending outward to another annular riser. Above that is annular shelf 92 extending outward to yet another annular riser. Above that is the narrow annular ledge 94.

Generally reflecting the shape of the recess 18 just described is the configuration of the piston 16 which is formed as a single plastic unitary molding comprising a series of progressively wider annular steps or working surfaces connected by annular risers. More broadly expressed, the piston is formed with a plurality of working surfaces arranged in non-overlapping fashion as seen in top plan view.

More specifically, from near the bottom up the piston comprises the first step or working surface 100 having an upward riser 100a; the second step or working surface 102 having the upward riser 102a; the third step a working riser 104 having upward annular riser 104a; the fourth step or working surface 106 having final upward annular riser 106a. At its lower end the piston is formed with a cylindrical passage 108 enlarged with a downward central recess 110. The piston 16 terminates in a beveled downward exhaust seat 112. As shown, the molded piston 16 may be formed with angled chamfers at its internal edges between risers and steps to make the structure more smooth so that it may be inserted more easily onto the divider or insert 20 without harm to the O-rings of the insert, as will be described.

The last major unit of the regulator of the invention is the divider or insert 20. This may be of plastic and is formed to cooperate with the piston 16. The upper wider section of the divider 20 is designated 120. From the bottom up the divider is formed with the flat end 122 and the upward narrow cylindrical section 122a (FIG. 3) therefrom. Thereabove the first annular outward overhang 124 merges into the upward section 124a. Thereabove the second annular outward overhang 126 merges into the upward section 126a. The third annular outward overhang 128 above that merges with the upward section 128a. Thereabove the fourth annular outward overhang 130 meets the upward section 130a. Each of the cylindrical sections is grooved adjacent its lower end, each groove carrying an O-ring sealingly engaging the piston.

Figure 4:
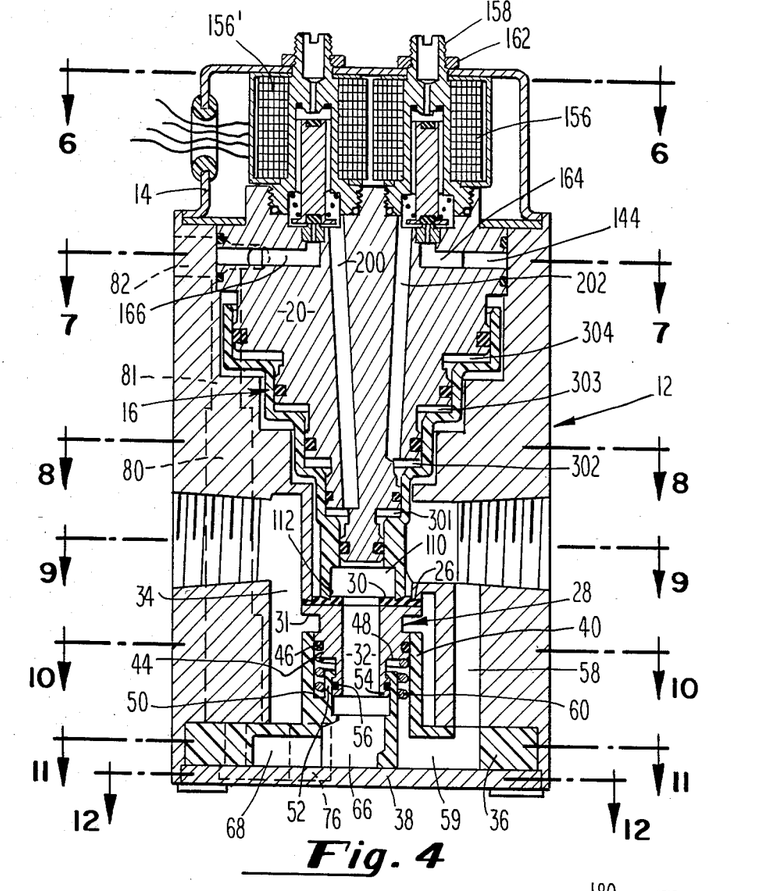
FIG. 4 is an enlarged sectional view taken on the line 4—4 of FIG. 1.
Figure 6:
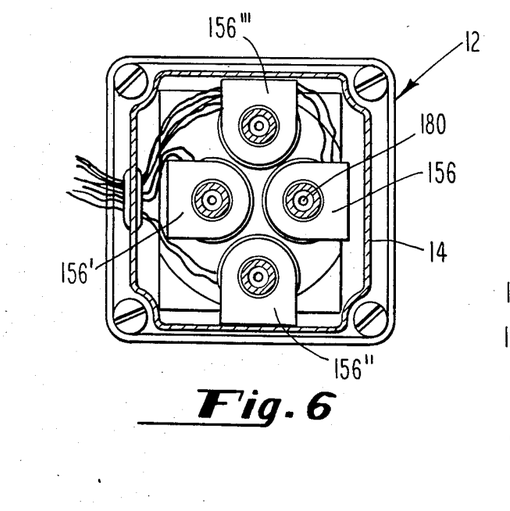
FIG. 6 is a sectional view taken on the line 6—6 of FIG. 4.

Referring alternatively to FIGS. 3 and 4, it will be understood that the plastic piston 16 may be assembled readily on to the divider 20 and that further, this entire subassembly may be inserted into the stepped recesses 18 of the body 12. It should be noted that the divider has mounted adjacent its upper end the mounting plate 136 which is rectangular and fits into a small recess 138 at the upper end of the body 12 and is held there by threaded fasteners (FIG. 6). The shoulder 132 of section 120 of the divider sits firmly on shoulder 94.

After this assembly (FIG. 4) it will be seen that the first step 100 of the piston is disposed just under the first overhang 124 of the divider 20 and the first step and the first overhang define between them a first pressure chamber 301. Likewise, the second step 102 of the piston is disposed just under the second overhang 126 and the second step and the second overhang define between them a second pressure chamber 302. Likewise, the third step 104 of the piston is disposed just under the third overhang 128 and the third step and the third overhang define between them a third pressure chamber 303. Similarly, the fourth step 106 of the piston is disposed just under the fourth overhang 130 of the piston and the fourth step and the fourth overhang define between them a fourth pressure chamber 304. As will be clear, the pressure chambers 301, 302, 303 and 304 are annular and they increase in size from the bottom up. The chambers are further defined by adjacent risers of the piston 16 and upward sections of the divider 20. In each of these pressure chambers, the associated step of the piston serves as working surface.

As stated, the lower end of the piston 16—that is, seat 112—rests on the gasket 30 of the poppet 28.

The internal formation of the divider or insert 20 will now be referred to. As will be noted in FIG. 3, the upper section 120 of the divider is formed with upper and lower O-rings, 140 and 142. At a level intermediate these O-rings 140 and 142, the inlet riser is formed with a deep circumferential channel 144 in alignment with the inlet passage 84. The upper end of the divider is formed with a central upward boss 150 which extends through an opening 152 in the mounting plate 136 to which the divider or insert is fixedly secured.

On the upper surface of the boss 150 in the embodiment shown individual solenoid mounting recesses 154 are formed and are tapped to threadingly receive individual solenoids 156, 156', 156", and 156''' (FIG. 6) as shown. The solenoids may be individually driven into their threaded openings by their slotted studs 158 which are formed at the upper end of each one, slotted to receive an ordinary screwdriver. O-rings 159 (FIG. 5) seal the solenoids to the divider. The solenoid cover 14 (FIG. 4) is provided and is appropriately apertured to receive the four studs 158. These studs are threaded as shown and receive cover securing nuts 162.

As best shown in FIG. 4, the divider or insert is drilled inwardly from the inlet circumferential channel 44 to form solenoid feed passages such as 164 and 166 as shown. These passages turn vertically and are enlarged and receive bushings 172 which are centrally bored and the upper end of which protrudes upwardly to form the solenoid valve seat 174.

Figure 5:
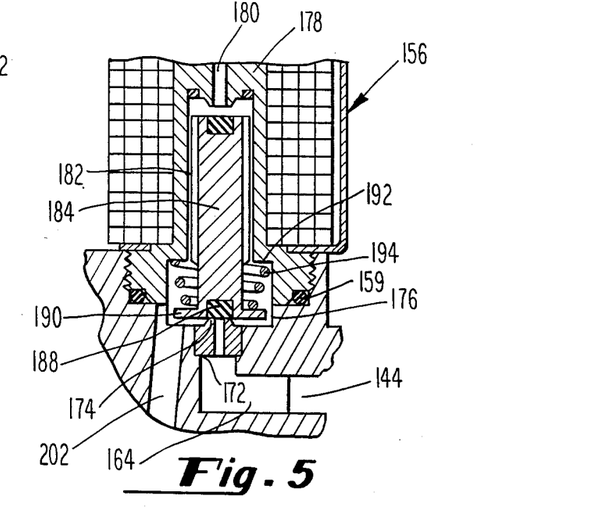
FIG. 5 is an enlarged fragmentary view of a solenoid as used in the embodiment shown.

For simplicity, the description now refers to FIG. 5 as typical of each of the solenoid installations. Outward from the seat 174 and bushing 172, the boss 150 is in each case formed with an armature-receiving recess 176. The solenoid 156 is formed with a core 178 which has an axial exhaust opening 180. The core has an armature-receiving recess 182 which receives the armature 184 which is formed on opposite ends with gaskets 186 and 188, respectively. The lower end of the armature is formed with an outward flange 190 and the recess within the solenoid has a downwardly facing shoulder 192. A solenoid spring 194 is disposed in compression between the shoulder 192 and the flange 190 to hold the solenoid normally seated on the seat 174.

It will be clear from reference to the drawings that the armature-receiving recess surrounding the individual seats lead respectively to the pressure chambers 301, 302, 303, and 304 as partially shown in FIG. 4. As an example, passage 200 extends from the armature-receiving recess of the solenoid 156' down to intersect to the overhang 124 is pressure chamber 301. Similarly, the passage 202 extends from the armature-receiving recess 176 (FIG. 5) of the solenoid 156 and slants down to intersect the overhang 126 in pressure chamber 302. Referring to FIG. 7, it will be clear that forwardly of the section of FIG. 4. the solenoid 156" has its passage 204 extending downward (not shown) to intersect overhang 128 in pressure chamber 303 and solenoid 156''' has its passage 206 slanting down (also not shown) to intersect overhang 130 in pressure chamber 304.

Further reference to FIG. 2 may be of help. It will be seen that activation of solenoid 1 (solenoid 156' in the FIG. 4 embodiment) will cause inlet pressure to pass to the first pressure chamber 301; activation of solenoid 2 (156) will cause air to pass to the second chamber 302; activation of solenoid 3 (156") will cause the third chamber 303 to be pressurized; and activation of solenoid 4 (156''') will cause the fourth chamber to be pressurized. As can be imagined, the more of the chambers that can be activated, generally speaking, the more force the piston exerts downwardly and unseat the poppet to permit inlet pressure to pass into the outlet 24.

It will be seen best from FIGS. 2 and 4 that opposing the force acting downward on the piston as the chambers 301, 302, 303, and/or 304 are pressurized is the upward force of the outlet pressure acting on the underside of the steps of the piston 16 in the space generally designated 220 between the stepped recess 18 and the underside of the piston. Also, opposing the unseating of the piston is the upward urging of the spring 60 and the upward force of the inlet pressure on the under surface 31 of the poppet 28.

OPERATION

Figure 9:
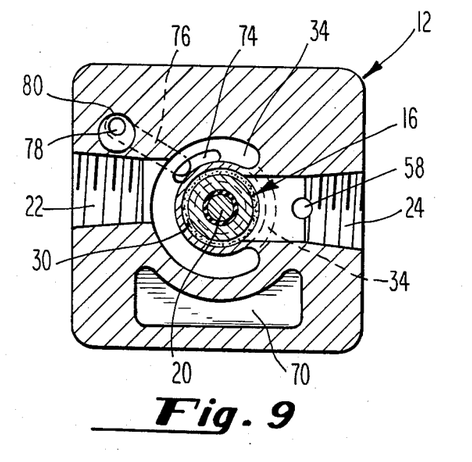
FIG. 9 is a sectional view taken on the line 9—9 of FIG. 4.

In operation, the inlet air comes in threaded inlet 22 and enters the annular chamber 34 around the seat 26. The poppet 28 is seated, the gasket 30 engaging the seat 26, urged upward by pressure on its under-surface 31 and by the spring 60. Inlet air, as stated, also passes down channel 74, through channel 76 (FIG. 9) up passage 78, 80, and 82, (FIGS. 10, 11) into circumferential channel 144 and through the solenoid feed passages 164, 166, 208, and 210 to the solenoid seats 174 (FIG. 5).

Depending on how many of the solenoids 156–156''' are activated, corresponding chambers 301, 302, 303, and 304 will be pressurized as air feeds down passages 200, 202, 204, and 206, respectively. Assuming just solenoid 156' is energized, only the small first pressure chamber 301 will be pressurized through passage 200. The downward presure in this chamber working against step 100 will be sufficient to urge the piston 16 and poppet 28 down to open the seat 26. When the outlet pressure builds up so that the total of the upward force working on the under surface of the steps of the piston 16 in the chamber 220 equals the downward pressure exerted on step 100 in the first chamber 301, the spring 60 will raise the poppet to close the seat 26.

The above sequence of operations is true irrespective of how many solenoids are activated. For instance, if all four solenoids (156–156''') should be activated, each of the pressure chambers (301, 302, 303, and 304) will be pressurized with inlet air. This will drive the piston downwardly to unseat the poppet 28, permitting air to pass into the outlet until the outlet pressure is sufficient in chamber 220 combined with spring 60 to force the piston 16 upward against the downward force of the pressure in the chambers 301, 302, 303, and 304, so that the regulated pressure is reached.

Should it subsequently be necessary or desired to reduce the pressure in the line connected to outlet 24, one or more of the solenoids may be deactivated by the operator by opening one, or more of the switches $S_1$, $S_2$, $S_3$, and $S_4$ in FIG. 2. This will vent to atmosphere through the related solenoid exhaust 180 (FIG. 4), and depressurize the associated pressure chamber. The consequent reduction in the force driving the piston 16 down will be more than offset by the pressure in the chamber 220 working on the under surface of the steps of the piston. The piston 16 will thereupon raise permitting the poppet 28 to seat and the piston 16 to raise its seat 112 off the gasket 30 and permit exhaust through passage 32, 66, 68 up passage 70 and out the outlet 72 until the upward force on the piston does not exceed the downward force and the piston again seats on gasket 30, closing the exhaust at the exact desired lesser pressure.

Referring further to the solenoids 156 (FIG. 5), each includes an exhaust passage 180 which permits (after the solenoid is de-energized) the corresponding pressure chamber 301, etc., to vent to atmosphere as stated. Thus, there will be no residual air pressure in the nonworking chambers when the corresponding solenoid is not activated.

Figure 12:
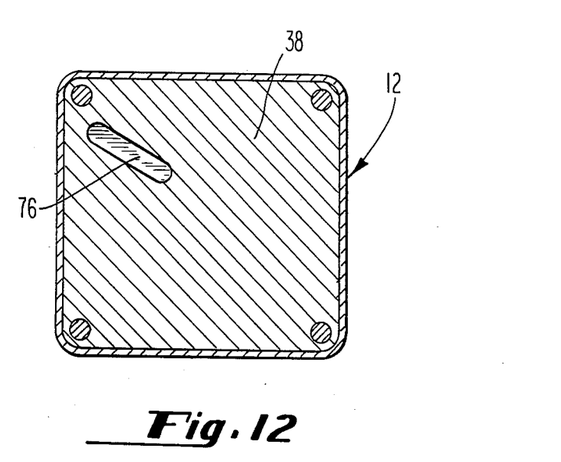
FIG. 12 is a sectional view taken on the line 12—12 of FIG. 4.

If it is desired to externally pipe inlet air to the solenoids the solenoid inlet 82 may be unplugged and used. To close off the internal communication between the inlet pressure well 34 and the inlet passage 80, it is only necessary to invert the plate 38 (FIG. 12). This may be done by removing the headed fasteners holding it, removing the plate 38, inverting it and replacing it, and replacing the fasteners.

The reason one may want to use external solenoid-feed piping through fitting 82 should be explained. It may be that the desired range of outlet pressures is markedly below the inlet pressure. For instance, suppose that the inlet pressure is 200 PSIG and that it is desired to have an outlet range of 0–50 PSIG. Rather than installing an expensive high-flow regulator upstream from inlet 22 to reduce the inlet pressure from 200 PSIG down to 50 PSIG to give the desired lower range at outlet 24, it is merely necessary under the structure shown to invert plate 38 as described and install an upstream T fitting and pipe the solenoid inlet through an inexpensive low-flow regulator set at 50 PSIG to the inlet 82.

UNIFORM INCREMENTS IN OUTLET PRESSURE

By virtue of the above structure and operation, it will be apparent that the inlet pressure can be divided so that depending on how many solenoids are activated, desired fractions of the inlet pressure can be achieved. For instance, the areas of the working surfaces of the piston steps can be related so that, for example, by selecting the appropriate combination of solenoid activation arrangements, the inlet pressure can be regulated to settings an equal distance from each other in the spectrum from 0 up to full pressure. This is highly desirable and may be achieved by having the working surface of, for instance, the first step 100 in the first pressure chamber 301 one half the area of the working surface of step 102 in chamber 302; the area of step 102 one half the working area of step 104 in chamber 303; and the working surface area of step 104 one half the area of the working surface of step 106 in chamber 304. Illustratively, taking an inlet pressure of 75 PSIG, the followng table shows how that pressure may be divided into fifteen equaldistance settings.

TABLE I

| Sol. 1 | Sol. 2 | Sol. 3 | Sol. 4 | Working Surface Activated | Working Area Activated | Outlet Pressure |
|--------|--------|--------|--------|---------------------------|------------------------|-----------------|
| Off | Off | Off | Off | None | None | 0 PSIG |
| On | Off | Off | Off | 100 | A Units | 5 PSIG |
| Off | On | Off | Off | 102 | 2A | 10 PSIG |
| On | On | Off | Off | 100 + 102 | A + 2A = 3A | 15 PSIG |
| Off | Off | On | Off | 104 | 4A | 20 PSIG |
| On | Off | On | Off | 100 + 104 | A + 4A = 5A | 25 PSIG |
| Off | On | On | Off | 102 + 104 | 2A + 4A = 6A | 30 PSIG |
| On | On | On | Off | 100 + 102 + 104 | A + 2A + 4A = 7A | 35 PSIG |
| Off | Off | Off | On | 106 | 8A | 40 PSIG |
| On | Off | Off | On | 100 + 106 | A + 8A = 9A | 45 PSIG |
| Off | On | Off | On | 102 + 106 | 2A + 8A = 10A | 50 PSIG |
| On | On | Off | On | 100 + 102 + 106 | A + 2A + 8A = 11A | 55 PSIG |
| Off | Off | On | On | 104 + 106 | 4A + 8A = 12A | 60 PSIG |
| On | Off | On | On | 100 + 104 + 106 | A + 4A + 8A = 13A | 65 PSIG |
| Off | On | On | On | 102 + 104 + 106 | 2A + 4A + 8A = 14A | 70 PSIG |
| On | On | On | On | 100 + 102 + 104 + 106 | A + 2A + 4A + 8A = 15A | 75 PSIG |

It will thus be clear depending on which switches are activated in FIG. 2, that the additive function can be achieved and pressures changed from one setting to another instantaneously.

It can be readily envisioned that the outlet of the present valve can be connected to various uses in robotics and the solenoids can be connected directly with a microprocessor or computer controlling the input to the various solenoids.

The valve described above finds application in a wide variety of uses. For instance, it can be applied to control the pressure in a pneumatic cylinder so that the physical force applied by the connecting arm thereof exerts more or less force, depending on the setting. This is useful, for instance, in the controlling of robotic spot-welding equipment wherein less or greater electrode pressure is to be applied depending on the thickness of the material. As an example, in welding heavy gauge materials a relatively high electrode pressure is used while a lighter electrode pressure is used in thinner stock.

Another use of the regulator of the invention is in the tire making industry wherein the regulator can be used to instantly change the force acting to close the tire mold at various points in the molding process.

The regulator of the invention can be used as a three-way valve to control the stroke of a spring-opposed piston in a cylinder wherein the spring drives the piston on the return stroke after the cylinder is exhausted through the regulator of the invention. This is not possible with the ordinary regulator which is a two-way valve with no exhaust provision.

More generally, it can be imagined that by using a pair of regulators as described, one on each end of a piston can replace the conventional four-way valve for controlling cylinders. Not only is the use of a pair of regulators in accordacne with the present invention less complicated, less bulky, less cumbersome and less expensive, but also because inherent in the double arrangement described is the advantage whereby the exhaust is not open until the outlet is closed, and hence, there is no loss of air as the piston changes strokes. Such loss is inevitable in the conventional four-way poppet valves.

Further, it should be understood that the regulator of the invention as described may be simplified by dispensing with all but one of the solenoid valves and having between the remaining solenoid valve and the four pressure chambers as described in selector, for instance, a rotary disc having openings aligning with passages selectively, individually or in combination, to the chambers, depending on the setting of the selector. Indeed, if speed is not essential, all of the solenoids may be replaced by such a selector and a manually operated valve, and still attain some of the benefits of the invention.

Figure 13:
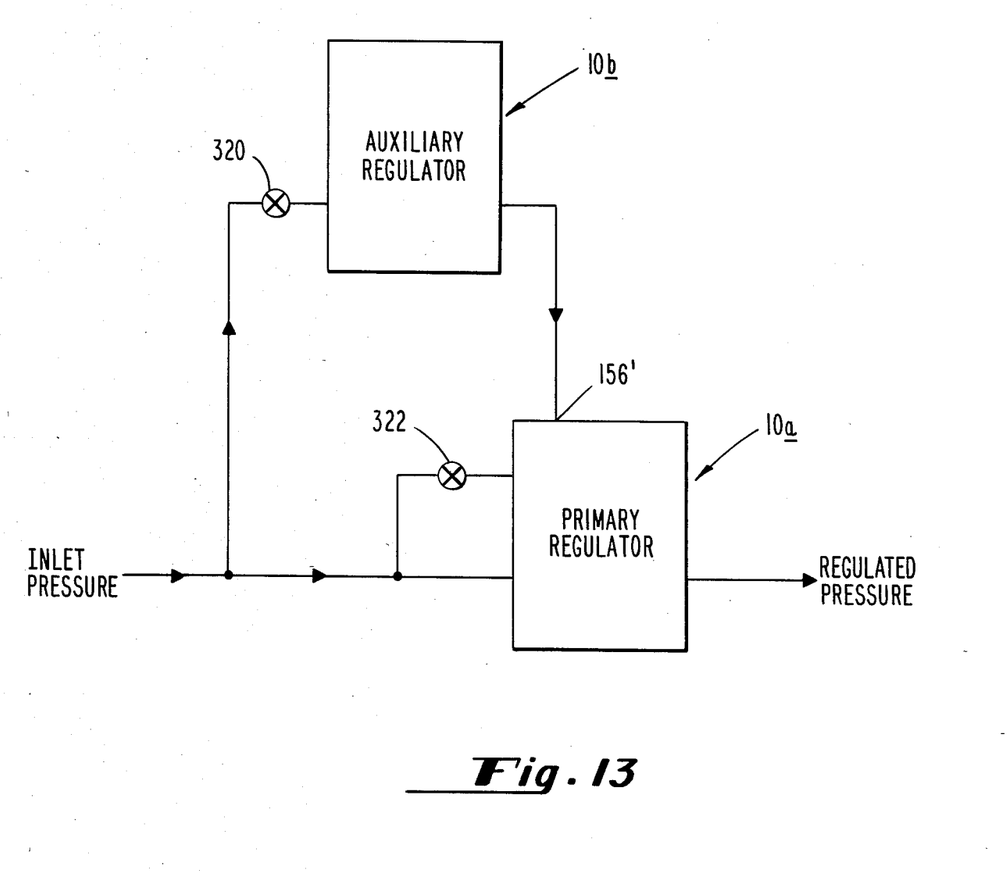
FIG. 13 is a flow diagram of a system embodying the invention.

A further number of uniform increments over a given pressure range can be achieved by using a pair of regulators 10a and 10b of the invention (FIG. 13). In such an arrangement, the primary regulator 10a has connected to its first pressure chamber 301 by means of the supply passage 200, the output of the auxiliary pressure regulator 10b. Conveniently, this may be done by attaching the outlet of the auxiliary regulator 10b to the exhaust nipple of the solenoid 156'. The outlet pressure of the primary regulator 10a may be controlled by the inexpensive regulator 322 in the external pilot supply 82 connected to the primary regulator as explained above. The outlet of the auxiliary regulator 10b may be adjusted to the appropriate magnitude by placing an inexpensive, ordinary, garden-variety, low-flow pressure regulator 320 in its inlet. The internal connections (76, 80, etc.) for the solenoid feed passages are used in the auxiliary regulator 10b.

The first step in setting the system disclosed in FIG. 13 is to, by manipulation of the ordinary regulator 322, adjust the desired setting the highest outlet of the primary regulator 10a. This fifteen increments of outlet of the auxiliary regulator 10b are then adusted by manipulation of regulator 320 so that when applied to chamber 301 they give the outlet of the primary regulator fifteen equal increments between "0" and the outlet of primary regulator 10a when its chamber 302 alone is activated without any input to chamber 301.

It will be seen that the fifteen increments of the chamber 301 may be used additive fashion for each of the pressure settings resulting from the combination of selections possible with chambers 302, 303, 304. Using this arrangement, it will be possible with a primary and auxiliary regulator each as structured in FIGS. 1 through 12 and using the seven solenoids (solenoid 156' of the primary regulator being permanently disconnected) to obtain 127 evenly spaced increments over a given pressure range.

TABLE II

When the primary regulator has a range of 0 PSIG to 112 PSIG:

| Primary Regulator | | | Auxiliary Regulator | | | | Outlet Pressure |
|---|---|---|---|---|---|---|---|
| Sol. 2 | Sol. 3 | Sol. 4 | Sol. 1 | Sol. 2 | Sol. 3 | Sol. 4 | |
| Off | Off | Off | Off | Off | Off | Off | 0 |
| Off | Off | Off | On | Off | Off | Off | 1 PSIG |
| Off | Off | Off | Off | On | Off | Off | 2 PSIG |
| Off | Off | Off | On | On | On | On | 15 PSIG |
| On | Off | Off | Off | Off | Off | Off | 16 PSIG |
| On | Off | Off | On | Off | Off | Off | 17 PSIG |
| On | Off | Off | Off | On | Off | Off | 18 PSIG |
| On | Off | Off | On | On | On | On | 31 PSIG |
| Off | On | Off | Off | Off | Off | Off | 32 PSIG |
| Off | On | Off | On | Off | Off | Off | 33 PSIG |
| Off | On | Off | On | On | On | On | 47 PSIG |
| On | On | Off | Off | Off | Off | Off | 48 PSIG |
| On | On | Off | On | Off | Off | Off | 49 PSIG |
| On | On | Off | On | On | On | On | 63 PSIG |
| Off | Off | On | Off | Off | Off | Off | 64 PSIG |
| Off | Off | On | On | Off | Off | Off | 65 PSIG |
| Off | Off | On | On | On | On | On | 79 PSIG |
| On | Off | On | Off | Off | Off | Off | 80 PSIG |
| On | Off | On | On | Off | Off | Off | 81 PSIG |
| On | Off | On | On | On | On | On | 95 PSIG |
| Off | On | On | Off | Off | Off | Off | 96 PSIG |
| Off | On | On | On | Off | Off | Off | 97 PSIG |
| Off | On | On | On | On | On | On | 111 PSIG |
| On | On | On | Off | Off | Off | Off | 112 PSIG |
| On | On | On | On | Off | Off | Off | 113 PSIG |
| On | On | On | Off | On | On | On | 126 PSIG |
| On | On | On | On | On | On | On | 127 PSIG |

The table has been broken to save space. The missing portions indicated by the dotted lines can be readily recreated, given the information in Table I and an understanding of the operation of the regulator as set forth hereabove.

It will be clear that using the system described and shown in FIG. 13 it is possible to punch in pressure instructions to a keyboard connected to a microprocessor which activates the solenoids in the sequence set forth in foreshortened Table II to give the desire of pressure. More realistically from a commercial standpoint, a computer can be used to direct any one of 127 pressures. Such a device will find great use where different precise pressures are to be selected over a given range of pressures.

There are a wide variety of other uses of the invention and it is also envisioned that other forms of the valve described may be useful. Thus, while this invention has been described in but a single embodiment, it is susceptible of many other forms limited only by the scope of the following claim language and equivalents thereof.

I claim:

1. A fluid pressure regulator comprising:
(a) body having;
an outlet connected to the upper side of a downward-facing first valve seat formed inside the body,
an inlet connected to the lower side of the seat, the body presenting an inner and outer concentric annular upward guide walls in the housing below and aligned with the first seat and partly defining between them an outlet pressure chamber connected to the outlet and defining inside the inner wall an exhaust chamber connected to the exterior of the body, the inner wall being shorter than the outer wall, and
an inverted stepped cone-like projection formed in the body and extending downward and aligned with and above the first seat, the projection having a plurality of generally cylindrical faces of increasing diameter as the upper end of the projection is approached and a plurality of passage means in the projection all having one end terminating respectively in openings adjacent the faces,
(b) a vertically reciprocable valve member having;
an axial passage and an upwardly facing annular sealing surface adapted in its upper position to engage upward against the first seat,
beneath the sealing service an upper piston cooperating with the outer of the concentric walls and adapted to be urged upward by the outlet pressure in the outlet pressure chamber, and
a lower piston cooperating with the inner of the walls,
(c) a valve actuator in the housing adapted to be urged upward by the outlet pressure and having;
a stepped inner shape comprising spaced annular horizontal surfaces, the actuator reciprocably receiving the cone-like projection, and
terminating in a downward annular second seat adapted in the lower position of the actuator to engage downward against the sealing surface of the valve member inside the first seat,
(d) a plurality of control valve means connected between the inlet and respectively the plurality of passage means; and
(e) a plurality of seal means disposed between the projection and the actuator to isolate pressurewise chambers partly defined by individual annular horizontal surfaces of the actuator from chambers partly defined by other annular horizontal surfaces, whereby the outlet pressure may be precisely controlled depending on the selected one or number of control valve means in the "off" or "on" mode.

2. A regulator as claimed in claim 1 wherein the area of the individual annular horizontal surfaces of the actuator bear a simple and predetermined ratio to each other.

3. A regulator as claimed in claim 1 wherein the actuator is generally in the shape of a funnel and has a wall of uniform thickness.

4. A regulator as claimed in claim 1 wherein the control valve means are solenoid activated and the outlet pressure is controlled instantaneously.

5. A regulator as claimed in claim 1 wherein the valve member is spring biased upwardly.

6. A regulator as claimed in claim 1 wherein the seal means are O-rings mounted respectively in grooves on the generally cylindrical faces of the projection.

7. A fluid pressure regulator comprising:
a body having therein a seat dividing an upper outlet chamber from a lower inlet chamber;
a valve member having a central exhaust bore and urged upward against the seat by outlet pressure;
a funnel-shaped stepped actuator having inside it vertically spaced annular horizontal surfaces of increasing diameter toward the upper end of the actuator, the actuator being above the valve member and also urged upward on its underside by the outlet pressure, the actuator terminating at its lower end in a second seat adapted to engage the valve member inside the first seat and seal off the exhaust bore;
selectively activatable control valve members; and means for communicating inlet pressure from the control valve members respectively to work against the horizontal surfaces on the actuator.

8. A control system including a pressure regulator comprising:
   a first seat means dividing an inlet chamber and an outlet chamber,
   poppet valve means cooperating with the first seat means, having a central exhaust port venting to atmosphere,
   inlet-pressure-activated actuator piston means having a second seat at its end adapted to engage and unseat the valve means and in so doing seat on the poppet about the exhaust opening to close it off, the actuator piston means being a generally funnel-shaped, stepped actuator having a plurality of co-axial annular individual radially disposed segments of increasing inner diameter as one end of the piston means is approached; and disposed on the side of the piston opposite the valve means,
   means for selectively supplying inlet pressure to the individual segments to urge the actuator piston means to engage and unseat the valve means, and
   means for supplying outlet pressure to the surface of the actuator piston means opposite the segments.

9. A control system as claimed in claim 8 wherein none of the radially disposed segments is aligned axially of the actuator means with another of the segments.

10. A control system as claimed in claim 8 wherein there are at least three radial segments and the relative magnitude of the areas of three of the radially disposed segments is 1, 2, and 4, respectively.

11. A control system as claimed in claim 10 wherein there is provided a second regulator similar to the one claimed and the outlet of the second regulator is selectively connected to the segment of the first regulator having the area with the relative magnitude of one (1).

12. A control system as claimed in claim 11 wherein the means for selectively supplying inlet pressure to the individual segments comprises solenoid-operated valves, respectively.

13. In a regulator comprising a housing having an inlet and an outlet and a seat having a poppet adapted to valve off the seat, and bias means adapted to unseat the poppet, the improvement wherein:
   the bias means includes a generally funnel-shaped, stepped piston comprising a plurality of separately chambered working surfaces arranged in non-overlapping fashion as seen in top plan view and the outlet of the regulator is exposed to the backside of all the working surfaces, and
   control means are provided to selectively pressurize the chambers, individually or in combination.

14. A regulator as claimed in claim 12 wherein the poppet has a central exhaust opening communicating with the atmosphere normally blocked by an end of the piston sitting on the poppet, but when the outlet pressure of the regulator working on the backside of the piston overwhelms the force on the chambered piston surfaces raises the piston to let the poppet close off the seat and permit part of the pressure to exhaust through the exhaust opening.

15. A regulator as claimed in claim 12 wherein the ratio of areas of the working surfaces of the piston are 1:2:4.

16. A regulator as claimed in claim 12 wherein the control means are separate individual solenoid valves.

17. A regulator as claimed in claim 12 wherein the piston is stepped having longitudinally spaced annular working surfaces of increasing diameter as the end of the piston away from the poppet is approached.

* * * * *